United States Patent
Yu

(10) Patent No.: US 8,392,032 B2
(45) Date of Patent: Mar. 5, 2013

(54) METHOD OF HEATING TARGET DEVICE IN COMPUTER SYSTEM

(75) Inventor: Shih-Hao Yu, Hsin-Chu County (TW)

(73) Assignee: Getac Technology Corporation, Hsinchu (TW)

( * ) Notice: Subject to any disclaimer, the term of this patent is extended or adjusted under 35 U.S.C. 154(b) by 642 days.

(21) Appl. No.: 12/409,537

(22) Filed: Mar. 24, 2009

(65) Prior Publication Data

US 2010/0250019 A1 Sep. 30, 2010

(51) Int. Cl.
*G05D 23/19* (2006.01)
(52) U.S. Cl. .......... 700/300; 702/132; 361/679.54; 361/688; 374/141; 700/299; 62/186
(58) Field of Classification Search .......... 700/300, 700/299; 702/132; 361/679.54, 688; 374/141; 62/186
See application file for complete search history.

(56) References Cited

U.S. PATENT DOCUMENTS

2006/0178785 A1* 8/2006 Chang et al. .......... 700/300
2007/0272678 A1* 11/2007 Meyuchas et al. .......... 219/494

* cited by examiner

*Primary Examiner* — Tejal Gami

(57) ABSTRACT

A method is provided to heat a target device of a computer system by a heater equipped therein. The target device is heated to reach a target temperature through multiple temperature intervals. The method senses the current device temperature of the target device to compare with the preset interval temperature of the temperature interval and obtain a phase difference for adjusting a heating power. When heating the target device by the heating power, the current preset interval temperature of the current temperature interval is increased progressively by a preset temperature rising value to obtain the next preset interval temperature of the next temperature interval. Repeat the foregoing steps in every temperature interval until the preset interval temperature or the device temperature reaching the target temperature.

12 Claims, 8 Drawing Sheets

METHOD OF HEATING TARGET DEVICE IN COMPUTER SYSTEM

BACKGROUND OF THE INVENTION

1. Field of the Invention

The present invention relates to design of heating method, and more particularly, to a method of heating a target device in a computer system.

2. Related Art

If an electronic device (such as a notebook computer) needs to actuate or operate in a low-temperature environment, a heater (such as a hard drive heater) is required to heat the specific hardware module (such as a hard drive). However, no matter controlled by hardware circuitry or application software/firmware, the conventional heater in the prior art can only simply heat with a fixed heating power, or heat with different heating powers corresponding to different temperatures.

Please refer to FIG. 1. Temperature curve W1 indicates a temperature-time curve of a device when heated by the conventional heating technology in the prior art. In the conventional heating technology, only heating to reach a target temperature Tf is considered; the temperature changes occurred within every time interval during the heating process is not considered. Namely, only when the device is heated to achieve very close to the target temperature Tf (or even exceed), can the heating be ceased or the heating power be decreased. Therefore, the generated temperature curve W1 indicates a parabolic curve, which shows the unsteadily-rising rate of the device temperature.

Please refer to FIG. 2. Temperature curve W2 indicates a temperature-time curve of a heat-sensitive (the temperature rises rapidly when heated) device while heated by the conventional heating technology in the prior art.

The initial device temperature Td0 and the target temperature Tf is the same as in FIG. 1. But if the same conventional heating technology is applied to the heat-sensitive device, the generated temperature curve W2 shows the temperature rising in a severe and rapid scale.

Furthermore, in FIG. 2 the temperature curve W3 shows a temperature-time curve of the device when heated by the conventional heating technology in the prior art; only the initial device temperature Td0' is different from the initial device temperature Td0 preset for the heater.

When the initial device temperature Td0' is different from Td0, since the conventional heating technology uses the normal heating power to heat the device, the temperature curve W3 indicates that the device has already reached the target temperature Tf before finishing the preset heating duration F1, which inevitably causes the device overheated to reach a high temperature.

As a brief to the foregoing, when applying the conventional heating technology to an electronic device, there will be some problems including the unsteadily-rising temperature, the temperature changed instantly and rapidly, and the unexpected heating time. As to the heat-sensitive device, the heating mechanism can not be manually adjusted. Besides, once the heater changes its different heating source or the characteristic resistance of its heating medium, or the heater is used to heat different devices, the heating effect can not be perfectly predicted and controlled, and consequently, there will still be dramatic variation on the temperature curve.

SUMMARY OF THE INVENTION

Accordingly, the present invention provides a device heating method, which heats the target device through conducting the "actual temperature curve" of the target device to follow an "ideal temperature curve", thereby maintaining a steady rising temperature. The device heating method may be applied to various devices with different heat-sensitivities so as to maintain the similar temperature curve when heated. Meanwhile, since the heater is adjusted to follow the ideal temperature curve, the target device can still be heated to reach the target temperature within the preset heating duration even the initial temperature of the target device is not equal to a default value.

In an embodiment of the present invention, a device heating method is disclosed to heat a target device to a target temperature through multiple temperature intervals. The method senses the current device temperature of the target device to compare with the preset interval temperature of the temperature interval and obtain a phase difference for adjusting a heating power. When heating the target device by the heating power, the current preset interval temperature of the current temperature interval is increased progressively by a preset temperature rising value to obtain the next preset interval temperature of the next temperature interval. Repeat the foregoing steps in every temperature interval until the preset interval temperature reaching the target temperature.

In an embodiment of the present invention, after the target device is heated to reach the target temperature, the method keeps sensing the current device temperature of the target device. Then, compare the current device temperature of the target device and the target temperature to obtain a stable phase difference. Next, adjusting the heating power applied to the target device according to the stable phase difference, and then heats the target device by the adjusted heating power. Finally, the method repeats the foregoing steps to maintain the current device temperature of the target device at the target temperature.

Through the technical means proposed in the present invention, the target device may be heated through constant polling and adjusting, so as to follow the ideal straight line of the ideal temperature curve trace. Consequently, the target device will have a steady temperature rising rate and the temperature will increase progressively according to a preset temperature rising value when heated. Moreover, since the device temperature, when heated, is constantly sensed to adjust the heating power, the temperature changes of the target device are constantly controlled no matter what kinds of devices are heated. Therefore, the present invention may be applied to various types of target devices or different type of heater.

Furthermore, through the calculation and adjustment of the temperature rising value, even the initial device temperatures or the target temperature are different, the target device can still be heated to the target temperature through the present heating duration and maintain at the target temperature, thereby facilitating the target device a normal operation at a proper temperature range.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
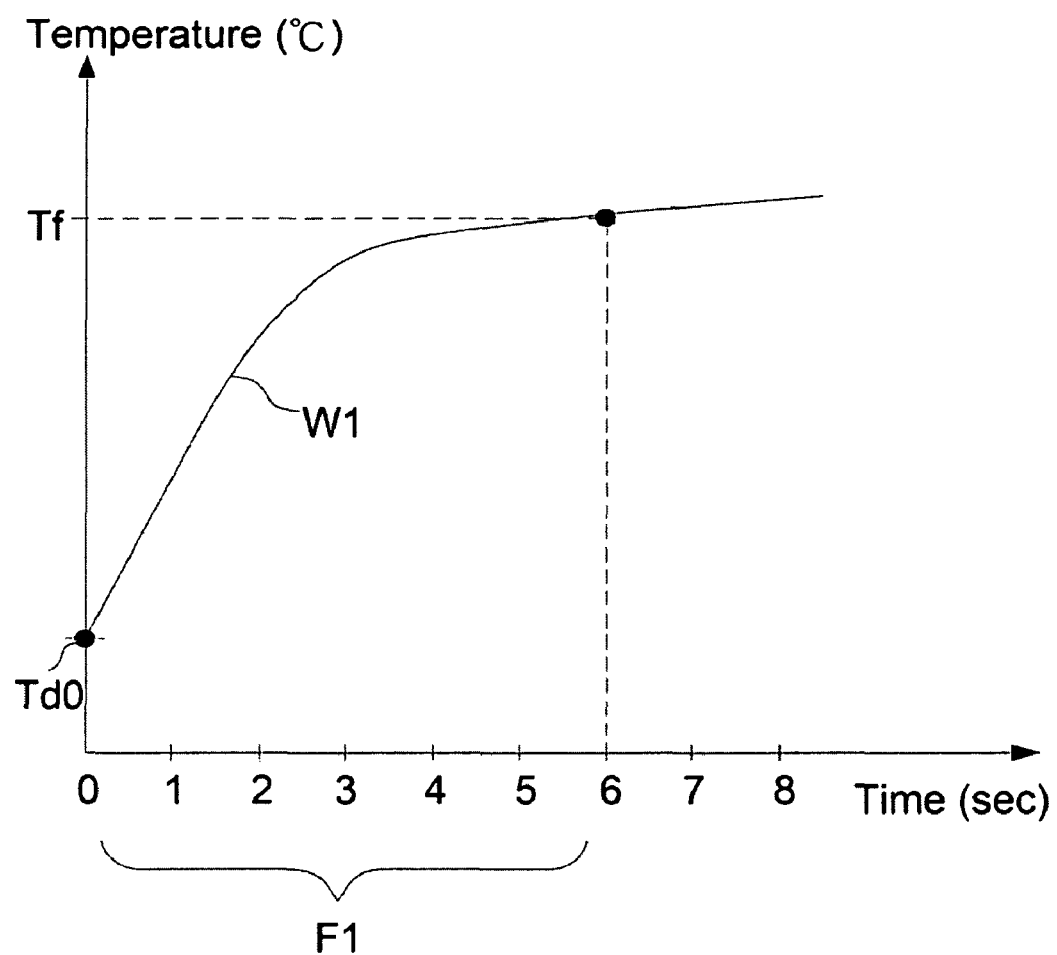
FIG. 1 illustrates a temperature curve diagram when heating by the conventional technology in the prior art.
Figure 2:
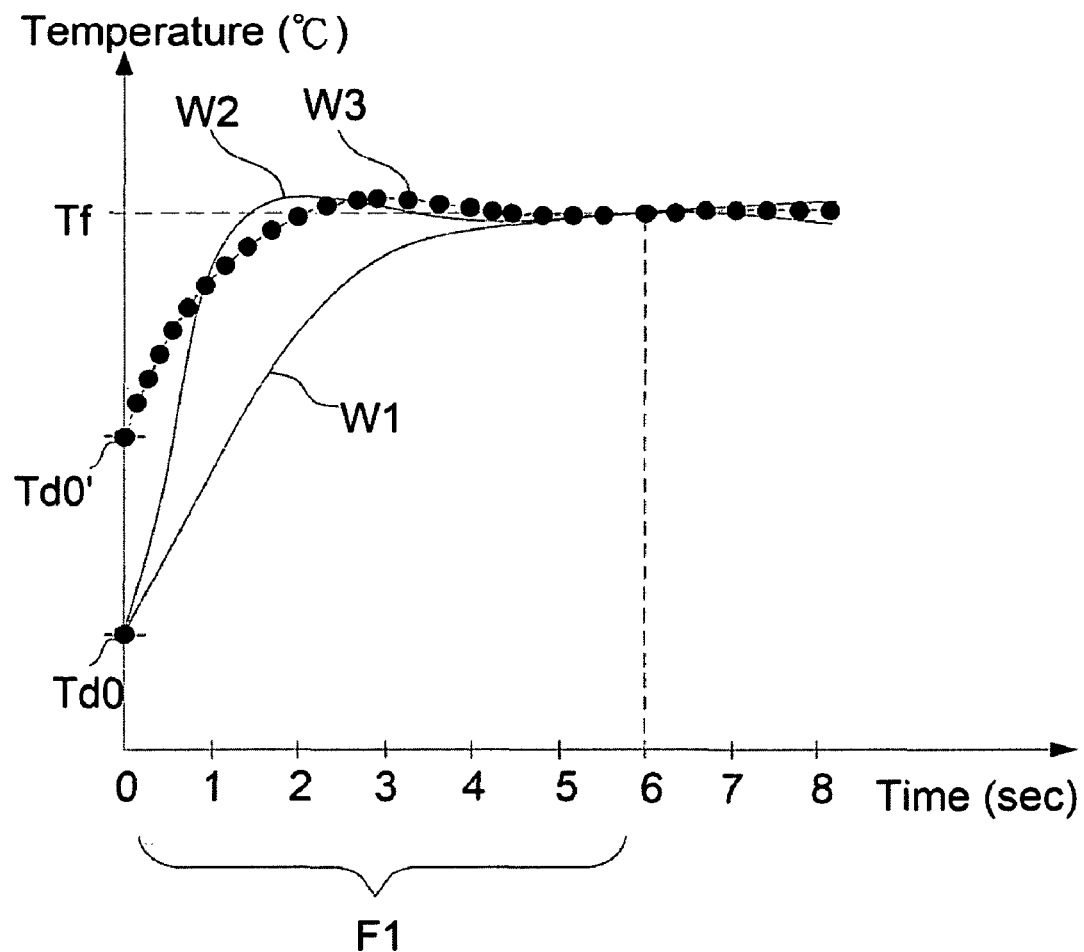
FIG. 2 is a temperature-time diagram illustrating two temperature curves W2 and W3, in which W2 indicate that a heat-sensitive device is heated by the conventional technology in the prior art, and W3 indicates when the initial device temperature is different.
Figure 3:
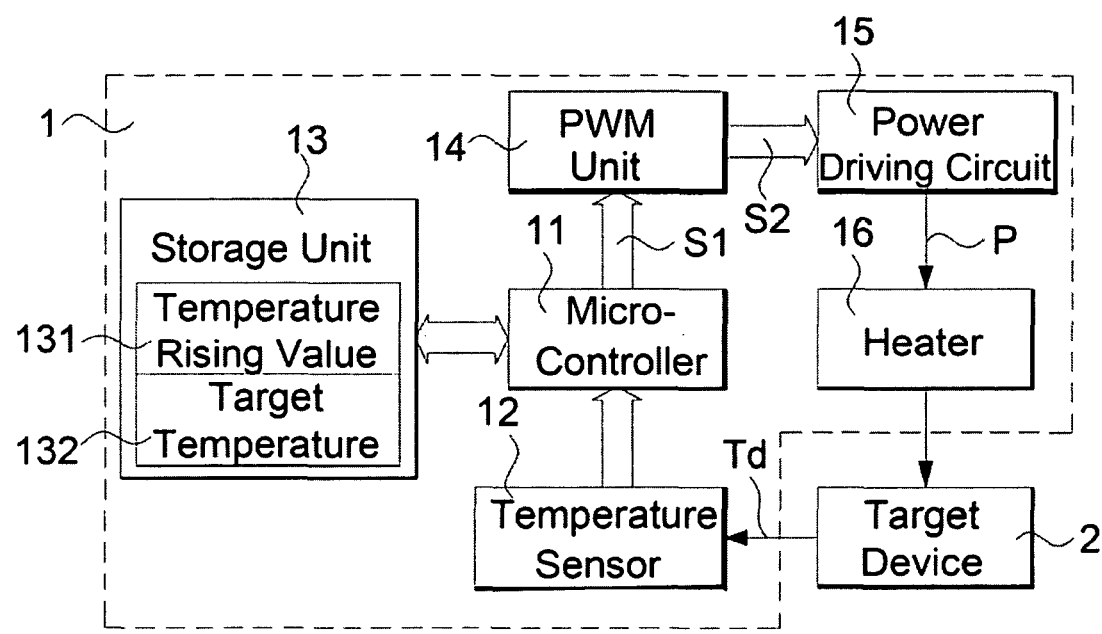
FIG. 3 is a circuit diagram of a preferred embodiment disclosed in the present invention.

Reference will now be made in detail to the present preferred embodiments of the invention, examples of which are illustrated in the accompanying drawings. Wherever possible the same reference numbers are used in the drawings and the description refers to the same or the like parts.

Please refer to 3, which is a circuit diagram of a preferred embodiment disclosed in the present invention. As shown in the drawing, the heating module 1 includes a microcontroller 11. The microcontroller 11 connects with a temperature sensor 12 and a storage unit 13 respectively, and also connects with a heater 16 through a PWM (Pulse Width Modulation) unit 14 and a power driving circuit 15. At least one of the heating module 1 and the target device 2 of the present invention is mainly applied to a portable electronic device or computer system, such as a notebook. The microcontroller 11 may be realized by an embedded controller equipped with a keyboard controller, while the target device 2 may be a hard drive. Aside from the PWM unit 14, a digital-to-analog circuit may be used to drive the heater 16.

The temperature sensor 12 senses a device temperature Td of the target device 2. The storage unit 13 includes a temperature rising value area 131 and a target temperature area 132. The power driving circuit 15 drives the heater 16 by a default heating power P to heat the target device 2. The PWM unit 14 adjusts the heating power P.

Figure 4:
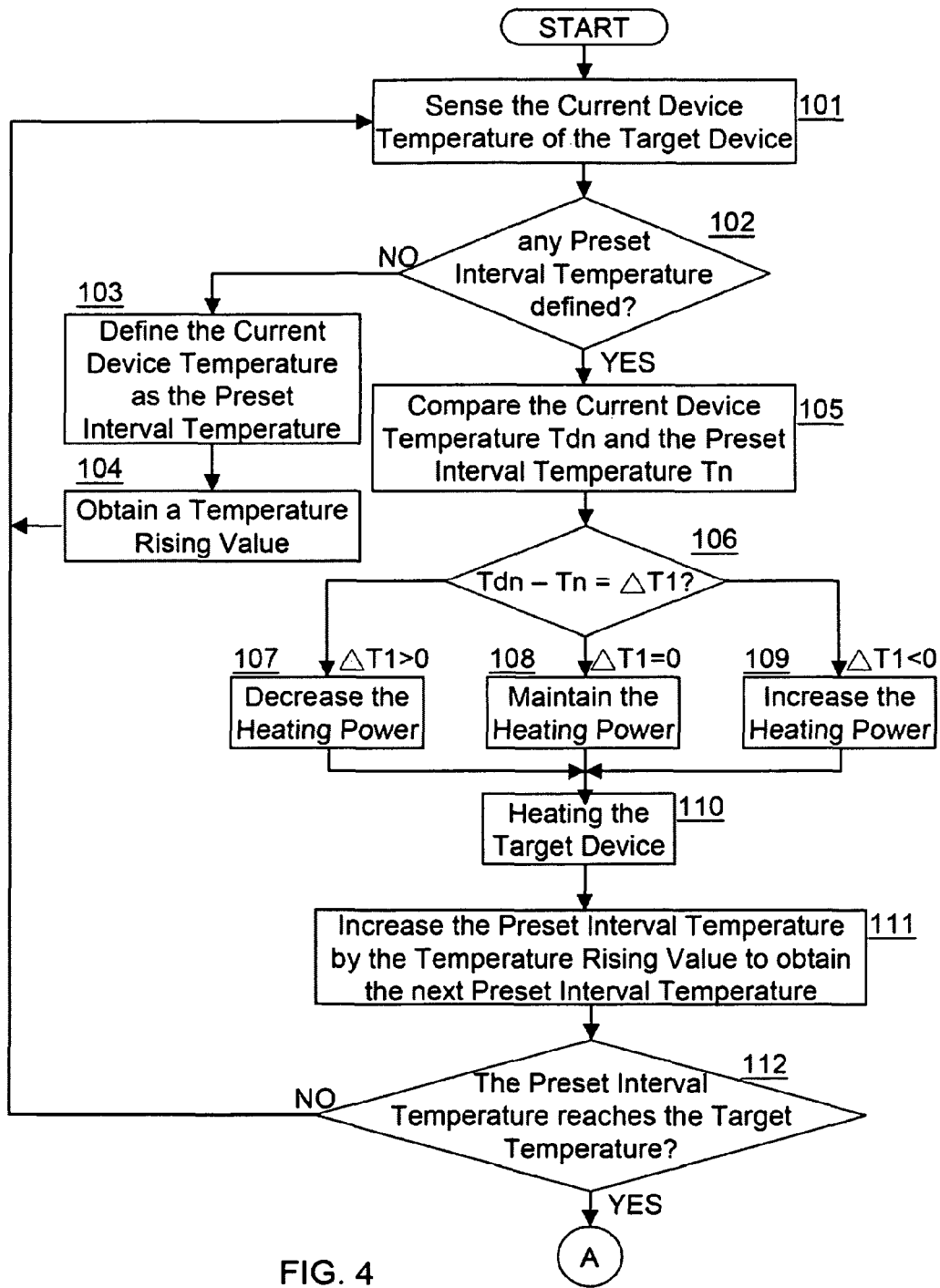
FIG. 4 is a partial flow chart of a preferred embodiment disclosed in the present invention.
Figure 5:
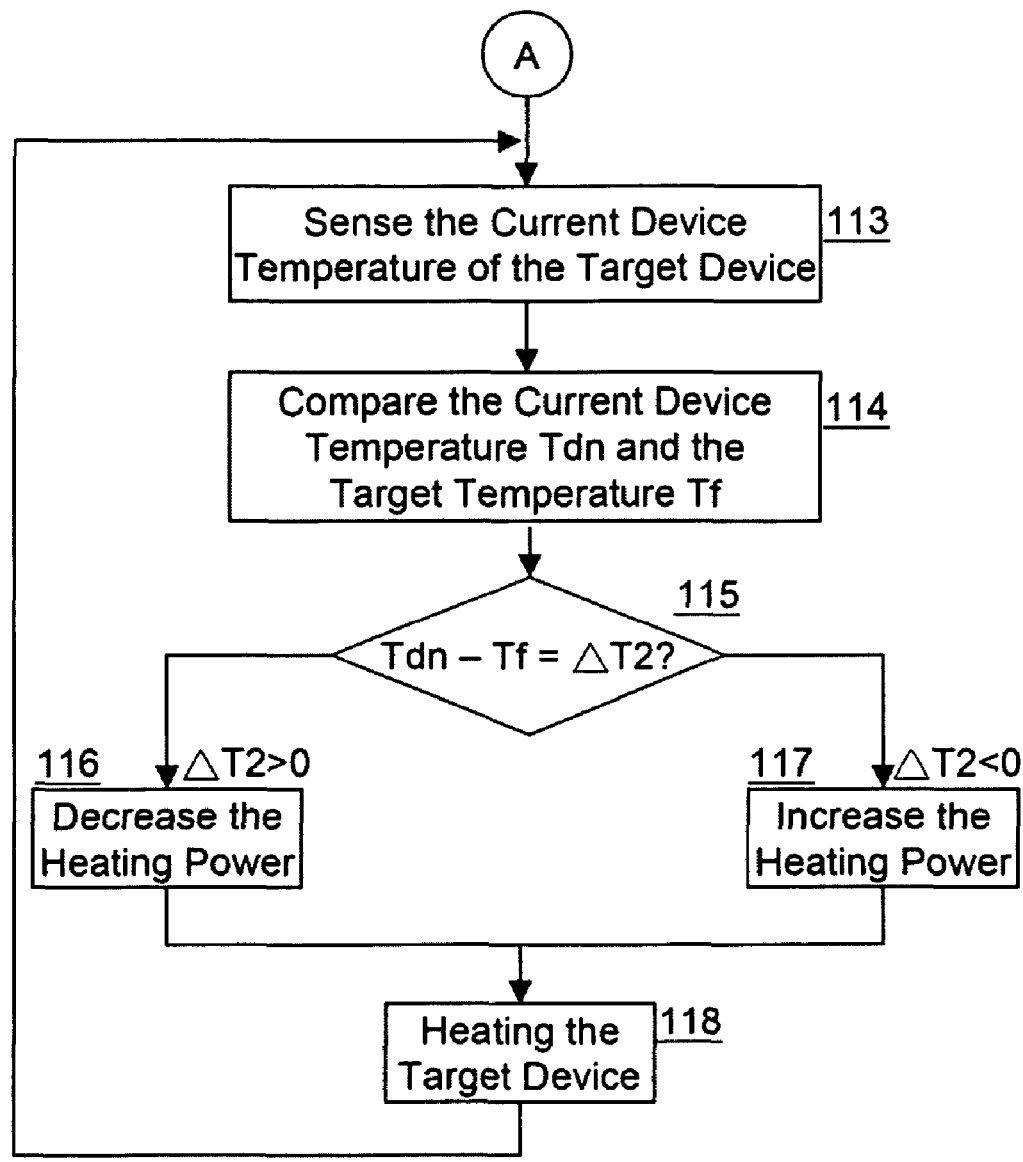
FIG. 5 is a continued partial flow chart of a preferred embodiment disclosed in the present invention.
Figure 6:
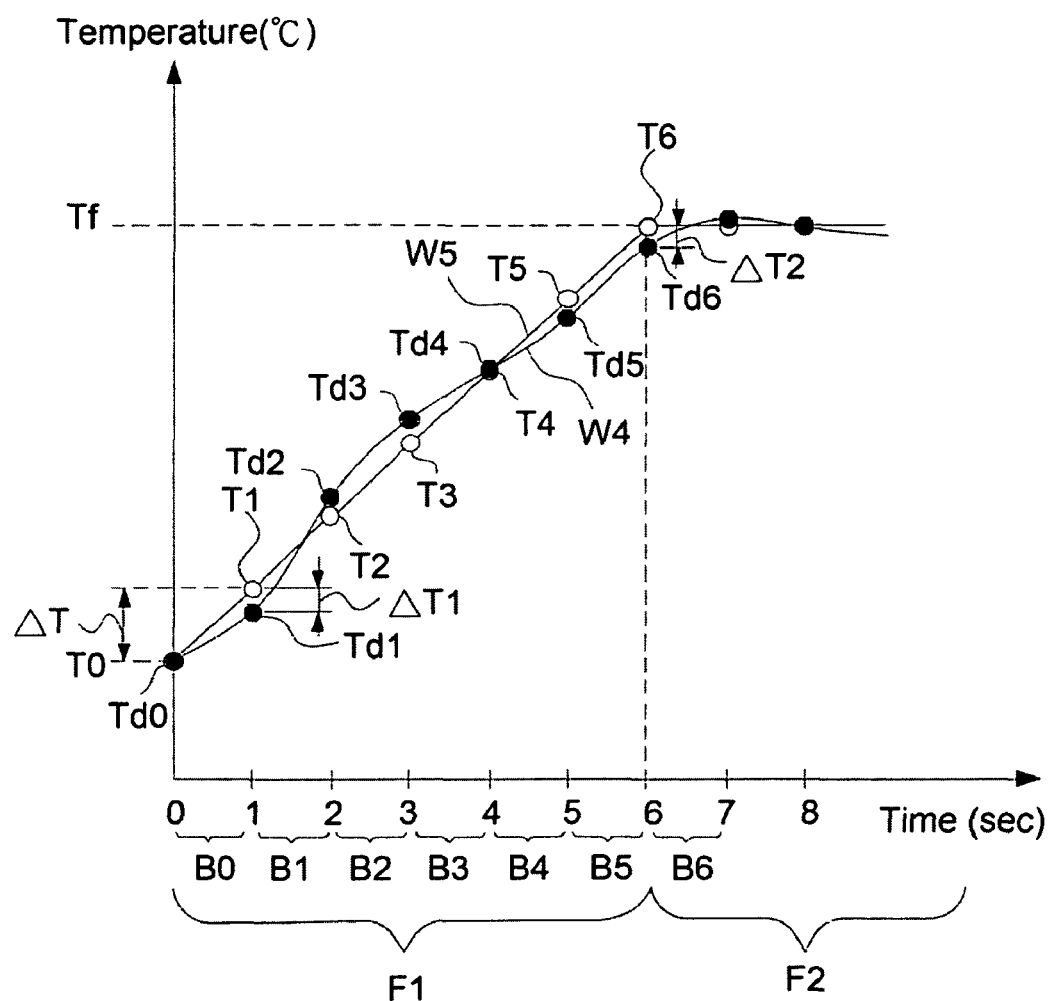
FIG. 6 is a temperature curve diagram that the device heating method of the present invention is employed to heat the target device.

Please refer to FIG. 4, FIG. 5 and FIG. 6 in parallel; wherein FIG. 4 and FIG. 5 are partial flow charts of a preferred embodiment disclosed in the present invention, and FIG. 6 is a temperature curve diagram that the device heating method of the present invention is employed to heat the target device. First of all, the temperature sensor 12 senses the device temperature Td of the target device 2 (Step 101). Next, the microcontroller 11 determines whether a preset interval temperature T0 is defined (Step 102). If not defined, the microcontroller 11 will define the currently-sensed device temperature Td as the current preset interval temperature T0 of the current temperature interval B0 (Step 103). Since the target device 2 is not heated yet at the current moment, the current device temperature Td of the target device 2 may be defined as the current initial device temperature Td0 of the target device 2.

Afterwards, the temperature rising value ΔT is obtained according to the initial device temperature Td0 and the target temperature Tf (Step 104). Since the target device 2 has to be heated to the target temperature Tf within a certain heating duration F1, according to the equation that the "rising slope" equals to the "risen temperature" divided by "time", the target temperature Tf minus the initial device temperature Td0 first and then divided by the time interval indicated by the heating duration F1 (the time interval in the present embodiment is 6 sec), the temperature rising value ΔT may thereby be obtained and stored in the temperature rising value area 131 of the storage unit 13.

In the preferred embodiment of the present invention, the target temperature Tf is stored in the target temperature area 132 of the storage unit 13 in advance, and may be preset by the user prior to starting the heating process. If the target device 2 is not required to be heated to the target temperature Tf within the preset heating duration F1, the temperature rising value ΔT may be determined by the user to adjust for different heating requirements.

After defining the preset interval temperature T0 and obtaining the temperature rising value ΔT, the microcontroller 11 compares the device temperature Td0 of the target device 2 sensed by the temperature sensor 12 and the preset interval temperature T0, to obtain a phase difference ΔT1 (Step 105). The purpose to obtain the phase difference ΔT1 is to compare the device temperature Td0 and the preset interval temperature T0, wherein the calculation may depend on different requirements. In the present embodiment the easiest calculation is used; namely, the device temperature T0 minus the preset interval temperature Td0 leaves the phase difference ΔT1 (i.e. the temperature difference between the device temperature T0 and the preset interval temperature Td0). Afterward, the microcontroller 11 determines the phase difference ΔT1, and sends correspondingly a power adjusting signal S1 to the PWM unit 14 (Step 106).

When the device temperature T0 is higher than the preset interval temperature Td0 (i.e. the phase difference ΔT1 is greater than zero), the PWM unit 14 receives the power adjusting signal S1 sent from the microcontroller 11, and sends a PWM signal S2 to the power driving circuit 15 according to the power adjusting signal S1. Then the power driving circuit 15 is conducted by a PWM mechanism to decrease the heating power P of the heater 16 applied to the target device 2 (Step 107).

When the device temperature T0 is equal to the preset interval temperature Td0 (i.e. the phase difference ΔT1 is equal to zero), the preset heating power P is maintained as the same (Step 108). When the device temperature T0 is lower than the preset interval temperature Td0 (i.e. the phase difference ΔT1 is smaller than zero), the heating power P will be increased (Step 109).

In the preferred embodiment of the present invention, the preset interval temperature T0 is defined from the initial device temperature Td0, so the device temperature Td0 is equal to the preset interval temperature Td0 of the temperature interval B0 (the phase difference ΔT1 is zero). Accordingly, the heating module 1 will maintain the heating power P as the same to heat the target device 2 (Step 110).

After the target device 2 is heated, the microcontroller 11 increases the preset interval temperature T0 progressively by the temperature rising value ΔT, so as to obtain the preset interval temperature T1 of the next temperature interval B1 (Step 111). The compensation is to add the temperature rising value ΔT to the preset interval temperature T0 and thereby obtaining the preset interval temperature T1.

Then the microcontroller 11 senses the device temperature Td1 of the target device 2 again by the temperature sensor 12, and compares the device temperature Td1 and the preset interval temperature T1 of the current temperature interval B1. As shown in the drawing, from the obtained phase difference ΔT1, we can find the device temperature Td1 of the target device 2 is smaller than the preset interval temperature T1 of the current temperature interval B1. Thus, the microcontroller 11 will adjust the PWM unit 14 to conduct the power driving circuit 15 to drive the heater 16 and thereby increase the heating power P to heat the target device 2.

When the device temperature Td2 of the heated target device 2 is greater than the preset interval temperature T2 obtained from the preset interval temperature T1 plus the temperature rising value ΔT, the microcontroller 11 will adjust through the PWM unit 14 to decrease the heating power P applied to the target device 2.

The microcontroller 11 uses the Polling mechanism to constantly sense each of the next device temperatures Td3, Td4, Td5 of the temperature sensor 12 by the target device 2, and compare with each of the preset interval temperatures T3, T4, T5 of the temperature intervals B3, B4, B5 respectively, thereby adjusting the heating power P of the heater 16. Through the constant polling and adjusting operations of the microcontroller 11, the temperature curve W4 of the heated target device 2 will be similar to the straight temperature curve W5. If the polling interval is shorter, the temperature curve W4 will approach more close to the straight temperature curve W5, which will not be different no mater the target device 2 is heat-sensitive or not. Even the heating module 1 is redesigned in a different way, or even the characteristic resistance of its heating medium changes, the temperature curve W4 will not have any significant difference.

The target device 2 is continuously heated until reaching the temperature interval B6. The preset interval temperature T6 of the temperature interval B6 (or the device temperature Td6 of the target device 2) will be determined if it reaches the target temperature Tf (Step 112). When the preset interval temperature T6 (or the device temperature Td6 of the target device 2) reaches the target temperature Tf, a fixed-temperature duration F2 will be conducted. At the moment, through the temperature sensor 12 the microcontroller 11 continuously senses the device temperature Td6 of the target device 2 (Step 113), and comparer the device temperature Td6 and the target temperature Tf to obtain a stable phase difference ΔT2 (Step 114). Similarly, the stable phase difference ΔT2 is obtained from the device temperature Td6 minus the target temperature Tf. Afterwards, the microcontroller 11 determines the stable phase difference to conduct corresponding adjustment of the heating power P through the PWM unit 14 (Step 115).

When the device temperature Td6 is higher than or equal to the target temperature Tf (i.e. the stable phase difference ΔT2 is greater than or equal to zero), the microcontroller 11 also use the PWM unit 14 to conduct the same PWM adjustment and decrease the heating power P (Step 116). When the device temperature Td6 is smaller than the target temperature Tf (i.e., the stable phase difference ΔT2 is smaller than zero), the heating power P will be increased (Step 117). Afterwards, the heating module 1 heats the target device 2 by the adjusted heating power P (Step 118). Through constant comparison between the device temperature and the target temperature Tf and the followed adjustment, the target device 2 may still maintain its temperature around the target temperature Tf after heated to the target temperature Tf.

Figure 7:
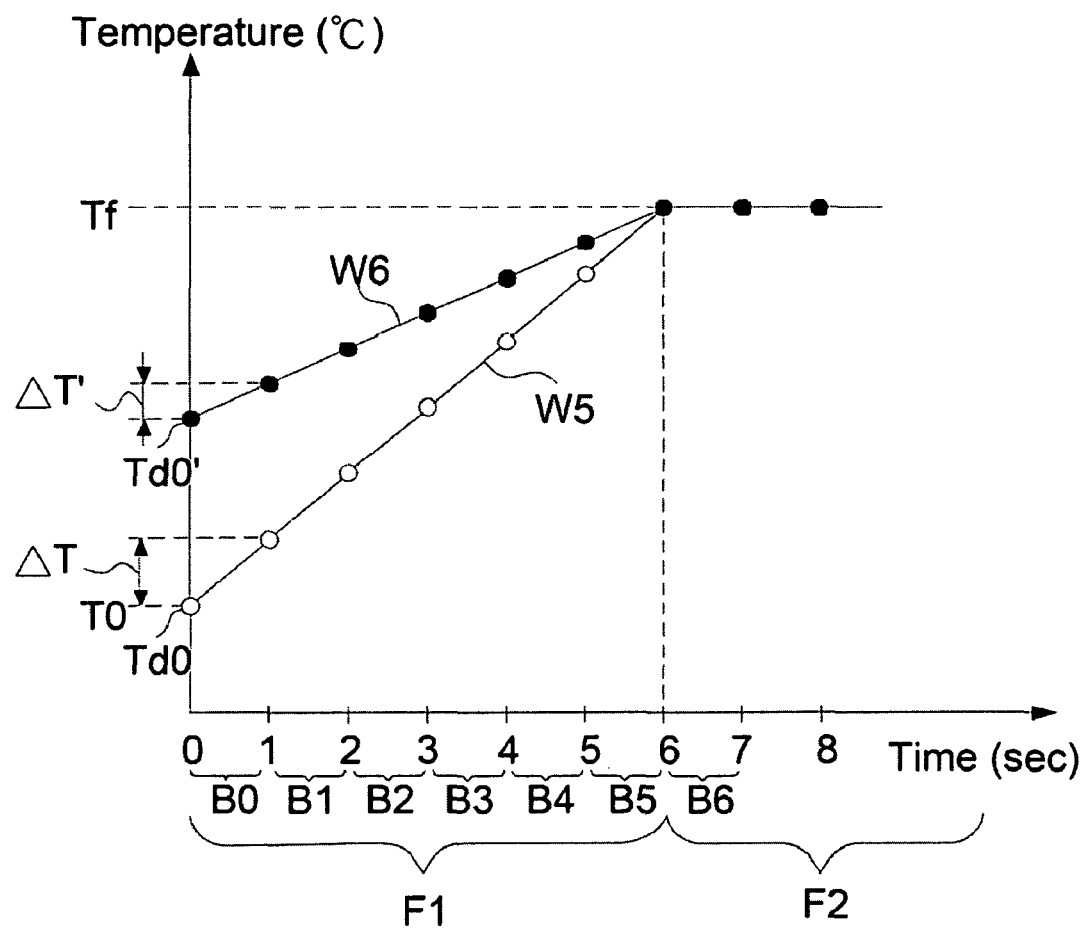
FIG. 7 is a temperature curve diagram that the device heating method of the present invention is employed to heat the target device from a different initial device temperature.

Please refer to FIG. 7, which is a temperature curve diagram that the device heating method of the present invention is employed to heat the target device from a different initial device temperature. As shown in the drawing, the temperature curve W6 indicates the temperature-time curve when heating the target device 2 from the different initial device temperature Td0'. When the target device 2 has the different initial device temperature Td0', since the equation that the rising slop equals to the risen temperature divided by the time interval, the temperature rising value ΔT' obtained from the target temperature Tf minus the initial device temperature Td0' and divided by the time interval indicated by the heating duration F1, should be different according to the initial device temperature Td0'. Thus, the target device 2 may still be heated to reach the target temperature Tf within the present heating duration F1. Certainly, in an actual heating operation, the temperature curve W6 will have inaccuracy as the temperature curve W4 in FIG. 6. Here the present invention just simply discloses a straight-line temperature curve W6 for better explanations.

Figure 8:
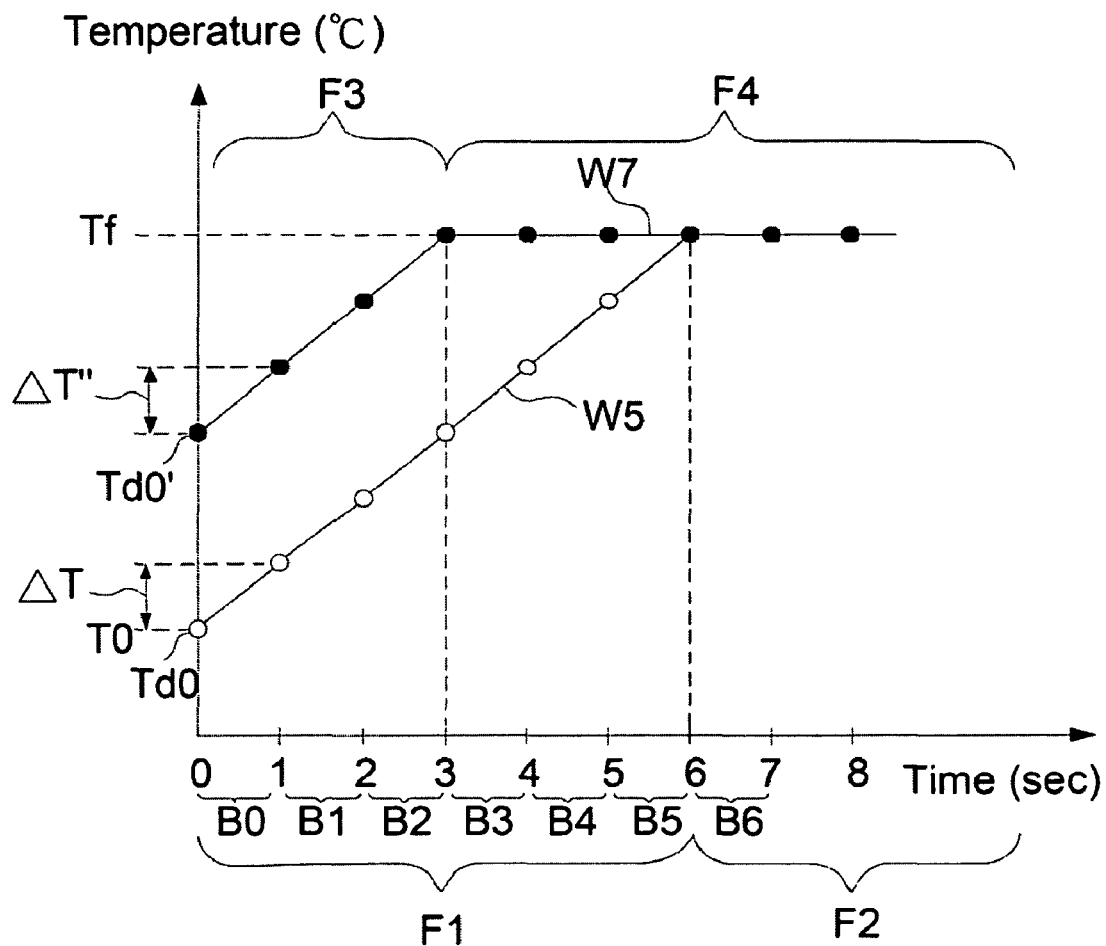
FIG. 8 is a temperature curve diagram that the device heating method of the present invention is employed to heat the target device from the different initial device temperature but within a fixed heating duration and a fixed temperature rising value.

Please refer to FIG. 8, which is a temperature curve diagram that the device heating method of the present invention is employed to heat the target device from the different initial device temperature but within a fixed heating duration and a fixed temperature rising value. As shown in the drawing, the temperature curve W7 indicates a temperature-time curve that the target device 2 is preset with the temperature rising value ΔT" as the same as the temperature rising value ΔT. The target device 2 is heated with the initial device temperature Td0' different from the initial device temperature Td0, so the target device 2 is heated to reach the target temperature Tf within a heating duration F3 shorter than the heating duration F1. However, such implementation will not have the same overheat problem as applying the conventional heating technology. Since after the target device 2 is heated to reach the target temperature Tf, the target device 2 enters into the fixed-temperature duration F4 from the heating duration F3, through the present invention the device temperature of the target device 2 can still maintain at the target temperature Tf without significant changes.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A method adapted to heat a target device of a computer system by a heater from an initial device temperature to a target temperature through a plural number of temperature intervals, the method comprising the steps of:
   (a) obtaining a preset temperature rising value;
   (b) determining a current preset interval temperature, beginning with the initial device temperature;
   (c) sensing the current device temperature of the target device;
   (d) comparing the current device temperature of the target device and the current preset interval temperature of the current temperature interval to obtain a phase difference;
   (e) adjusting a heating power of the heater applied to the target device according to the phase difference;
   (f) heating the target device by the adjusted heating power;
   (g) increasing progressively the current preset interval temperature of the current temperature interval by the preset temperature rising value to obtain the next preset interval temperature of the next temperature interval; and (h) repeating from the step (b) to the step (g) until the preset interval temperature reaching the target temperature;

wherein the temperature rising value is obtained by subtracting the initial device temperature from the target temperature and dividing the results by the number of temperature intervals; wherein in step (d), the phase difference is obtained from the current device temperature minus the preset interval temperature; and wherein in step (e) the heating power applied to the target device is adjusted through Pulse Width Modulation.

2. The method as claimed in claim 1, wherein in the step (e) the heating power is decreased if according to the phase difference the current device temperature is defined higher than the preset interval temperature, and the heating power is maintained the same if according to the phase difference the current device temperature is defined equal to the preset interval temperature, and the heating power is increased if according to the phase difference the current device temperature is defined lower than the preset interval temperature.

3. The method as claimed in claim 1 further comprising the following steps conducted after the step h:
   (i) sensing the current device temperature of the target device;
   (j) comparing the current device temperature of the target device and the target temperature to obtain a stable phase difference;
   (k) adjusting the heating power applied to the target device according to the stable phase difference;
   (l) heating the target device by the adjusted heating power; and
   (m) repeating from the step (i) to the step (l) to maintain the current device temperature of the target device at the target temperature.

4. The method as claimed in claim 3, wherein in the step (j) the stable phase difference is obtained from the current device temperature minus the target temperature.

5. The method as claimed in claim 3, wherein in the step (k) the heating power is decreased if according to the stable phase difference the current device temperature is defined higher than or equal to the target temperature, and the heating power is increased if according to the stable phase difference the current device temperature is defined lower than the target temperature.

6. The method as claimed in claim 3, wherein in the step (k) the heating power applied to the target device is adjusted through Pulse Width Modulation.

7. A method adapted to heat a target device of a computer system by a heater from an initial device temperature to a target temperature through a plural number of temperature intervals, the method comprising the steps of:
   (a) obtaining a preset temperature rising value;
   (b) determining a current preset interval temperature, beginning with the initial device temperature;
   (c) sensing the current device temperature of the target device;
   (d) comparing the current device temperature of the target device and the current preset interval temperature of the current temperature interval to obtain a phase difference;
   (e) adjusting a heating power applied to the target device according to the phase difference;
   (f) heating the target device by the adjusted heating power;
   (g) increasing progressively the current preset interval temperature of the current temperature interval by the preset temperature rising value to obtain the next preset interval temperature of the next temperature interval; and
   (h) repeating from the step (b) to the step (g) until the device temperature of the target device reaching the target temperature;

wherein the temperature rising value is obtained by subtracting the initial device temperature from the target temperature and dividing the results by the number of temperature intervals; wherein in step (d), the phase difference is obtained from the current device temperature minus the preset interval temperature; and wherein in step (e) the heating power applied to the target device is adjusted through Pulse Width Modulation.

8. The method as claimed in claim 7, wherein in the step (e) the heating power is decreased if according to the phase difference the current device temperature is defined higher than the preset interval temperature, and the heating power is maintained the same if according to the phase difference the current device temperature is defined equal to the preset interval temperature, and the heating power is increased if according to the phase difference the current device temperature is defined lower than the preset interval temperature.

9. The method as claimed in claim 7, further comprising the following steps conducted after the step (h):
   (i) sensing the current device temperature of the target device;
   (j) comparing the current device temperature of the target device and the target temperature to obtain a stable phase difference;
   (k) adjusting the heating power applied to the target device according to the stable phase difference;
   (l) heating the target device by the adjusted heating power; and
   (m) repeating from the step (i) to the step (l) to maintain the current device temperature of the target device at the target temperature.

10. The method as claimed in claim 9, wherein in the step (j) the stable phase difference is obtained from the current device temperature minus the target temperature.

11. The method as claimed in claim 9, wherein in the step (k) the heating power is decreased if according to the stable phase difference the current device temperature is defined higher than or equal to the target temperature, and the heating power is increased if according to the stable phase difference the current device temperature is defined lower than the target temperature.

12. The method as claimed in claim 9, wherein in the step (k) the heating power applied to the target device is adjusted through Pulse Width Modulation.

* * * * *